(12) United States Patent
Izzard

(10) Patent No.: US 6,966,139 B2
(45) Date of Patent: Nov. 22, 2005

(54) BOBBER WITH AUTOMATIC HOOK SET DEVICE

(76) Inventor: David Carl Izzard, 877 E. 5 Mile Rd., Sault Ste. Marie, MI (US) 49783

( * ) Notice: Subject to any disclaimer, the term of this patent is extended or adjusted under 35 U.S.C. 154(b) by 39 days.

(21) Appl. No.: 10/808,086

(22) Filed: Mar. 23, 2004

(65) Prior Publication Data

US 2005/0210730 A1   Sep. 29, 2005

(51) Int. Cl.⁷ .............................................. A01K 93/00
(52) U.S. Cl. ............................................ 43/15; 43/44.9
(58) Field of Search ............................. 43/15, 16, 44.9

(56) References Cited

U.S. PATENT DOCUMENTS

| | | | | |
|---|---|---|---|---|
| 283,444 A | * | 8/1883 | Wentworth | 43/15 |
| 751,734 A | * | 2/1904 | Hymers | 43/15 |
| 1,816,235 A | * | 7/1931 | Schroeder | 43/15 |
| 1,866,864 A | * | 7/1932 | Schroeder | 43/15 |
| 1,989,407 A | * | 1/1935 | Ezell | 43/15 |
| 2,144,175 A | * | 1/1939 | Zonn | 43/15 |
| 2,239,911 A | * | 4/1941 | Dorn | 43/15 |
| 2,374,752 A | * | 5/1945 | Gustav | 43/15 |
| 2,694,875 A | * | 11/1954 | Hoffmann | 43/15 |
| 2,712,194 A | * | 7/1955 | Di Stefano | 43/15 |
| 2,726,470 A | * | 12/1955 | Bass et al. | 43/15 |
| 2,755,589 A | * | 7/1956 | Osborne | 43/15 |
| 2,784,515 A | * | 3/1957 | Mcbride et al. | 43/15 |
| 2,799,109 A | * | 7/1957 | Remington | 43/15 |
| 2,808,673 A | * | 10/1957 | Coughlin | 43/15 |
| 2,818,671 A | * | 1/1958 | Crouch | 43/15 |

(Continued)

Primary Examiner—Harvey E. Behrend
Assistant Examiner—Susan C. Alimenti

(57) ABSTRACT

An improved Bobber for fishing that has an automatic locking hook set device built into the float. The Bobber with autolocking hook set device consists of a buoyant bobber float (10). The autolocking hook set device consists of a Slide tube (11), which is a tube with the lower end slightly restricted and a passage in the side for the passage of the locking mechanism, the Slide tube (11) is inserted vertically through the float (10). The Slide tube(11) holds the Slide (14), Spring sheath(15) assembly and Spring(16), which moves vertically, inside the Slide tube(11), The Slide(14) has a passage down through the center longitudally for the free passage of a Fishing line(26) The Spring(16) presses down against the lower restricted end of the Slide tube(11) and up against the upper inside restricted end of the Spring sheath(15). The trigger(13) also slides down into the inside bore of the Slide tube(11) and comes to rest on the tip of the Trigger pawl(18). The trigger(13) is tubular with a opening at the top end large enough for the passage of a fishing line(26) and a contact surface for an Enlargement placed on the fishing line(27). Onto the outside of the Slide tube(11) the Release mechanism frame(12) is positioned. Inside the Release mechanism frame(12) are the Trigger pawl(18), Slide locking pawl(21), Interlocking link(20), and Autolocking spring(22). The Trigger pawl(18) and the Slide locking pawl(21) are held into place with pins through the release mechanism frame(12). The Trigger pawl(18) and the Slide locking pawl(21) are connected with the Interlocking link (20). The Autolocking spring(22) places slight pressure onto the locking mechanism which causes the mechanism to automatically lock the Slide(14) down after a fisherperson manually pulls the Slide(14) down. The alignment of the Trigger pawl pivot pin(19), Interlocking link pivot pin(25) and the Interlocking link pivot pin (24) determines the amount of downward pressure that is required at the top of the trigger(13) to rotate the trigger pawl(18) and release the device. The alignment of these pins can be adjusted by the use of the Optional Sensitivety screw(17) which will allow the device to have adjustable sensitivety.

2 Claims, 9 Drawing Sheets

U.S. PATENT DOCUMENTS

| | | | |
|---|---|---|---|
| 2,876,578 A | * | 3/1959 | Argenio .......................... 43/15 |
| 3,220,138 A | * | 11/1965 | Greenfield .................... 43/15 |
| 3,766,680 A | * | 10/1973 | Torme et al. .................. 43/16 |
| 3,771,250 A | * | 11/1973 | Helmke ......................... 43/15 |
| 3,974,588 A | * | 8/1976 | Blom et al. .................... 43/15 |
| 4,021,957 A | * | 5/1977 | Gleason ......................... 43/16 |
| 4,124,948 A | * | 11/1978 | Mautner ....................... 43/15 |
| 5,123,196 A | * | 6/1992 | Pagano et al. ................. 43/37 |
| 5,937,565 A | * | 8/1999 | Maric et al. ................... 43/15 |
| 6,493,981 B2 | * | 12/2002 | Izzard .......................... 43/15 |

* cited by examiner

BOBBER WITH AUTOMATIC HOOK SET DEVICE

CROSS REFERENCE TO RELATED APPLICATION

Not Applicable

BACKGROUND

1. Field of Invention

This Invention relates to fishing floats, specifically to bobbers with built in hook setting devices.

2. Description of Prior Art

Presently there are many different types of fishing floats available to fishermen. To my knowledge there are no commercially available fishing floats with hook setting capabilities. There have been many attempts to design a fishing float with a built in hook setting device.

For example U.S. Pat. Nos., 1,989,407 and 2,144,175 and Swiss Patent 280761, all make valid attempts, but all fail to effectively reduce the amount of friction between the spring-loaded components and the release mechanism, when the device is set. In U.S. Pat. No. 1,989,407 direct spring pressure is pushing on catch 24, which creates a great deal of friction. Again in U.S. Pat. No. 2,144,175 direct springs pressure is placed onto part 21 and part 19, which creates friction in direct proportion to the strength of the spring. Again in Swiss Patent 280761, part 16 and part 17 are in direct contact and the amount of friction at the contact point is determined by the strength of the spring pushing up on part 7. A successful design must take into consideration the very small amount of downward pull created by a Fish biting and the relatively small amount of buoyancy provided by a float which is small enough to use as a fishing bobber. Consequently, the hook-setting device must release while the fish is pulling on the bait and the hook-setting device must release under less pressure than what is required to sink the float that the device is attached to.

SUMMARY

In accordance with the present invention a Bobber with Automatic Hook Set Device, comprises a fishing float with a automatic hook set device that provides an upward jerk on a fishing line after the downward pull on the same line by a fish.

Objects and Advantages

Several objects and advantages of the current invention are:

(a) To provide a Bobber with automatic Hook set device that is simple to operate.

(b) To provide a hook setting bobber with adjustable sensitivity on the hook setting mechanism.

(c) To provide a hook setting slip bobber that will function in any depth of water.

(d) To provide a Bobber with automatic hook set device that can be manufactured in a variety of sizes.

(e) To provide a design for a hook set device that can offer a longer Hook set.

(e) To provide a Slip Bobber with Automatic Hook set device, that is sensitive enough, to be released by the lightest biting fish. This feature will reduce mortality of fish that are caught and released.

This is because the fish will be hooked before they have an opportunity to ingest the hook deep into their throats where they could receive life-threatening injuries to their gills or digestive tract.

DRAWING FIGURES

Figure 1:
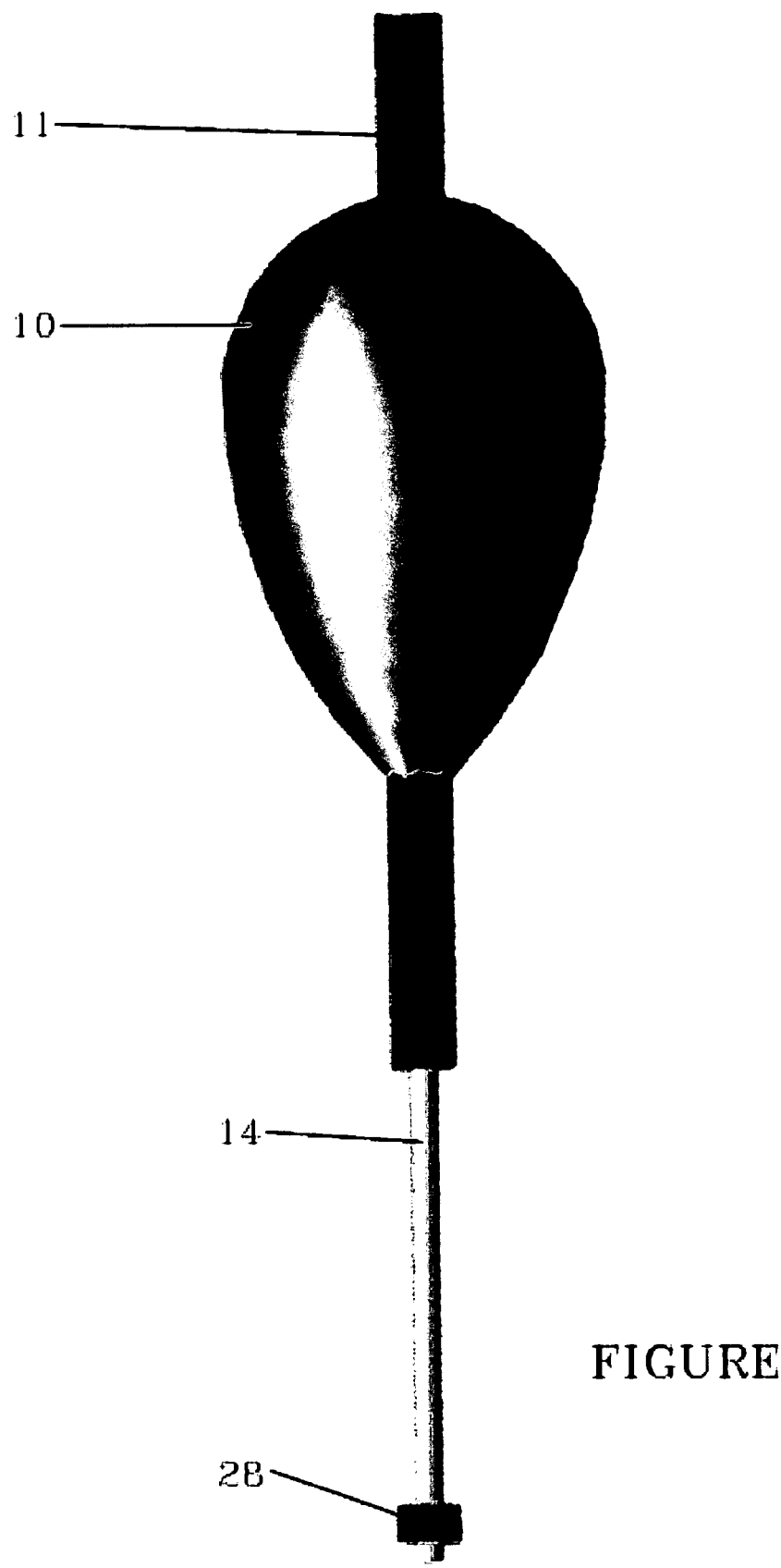
FIG. 1 is a front view of the Bobber with automatic Hook set Device, with the spring compressed and locked in the fishing position.
Figure 2:
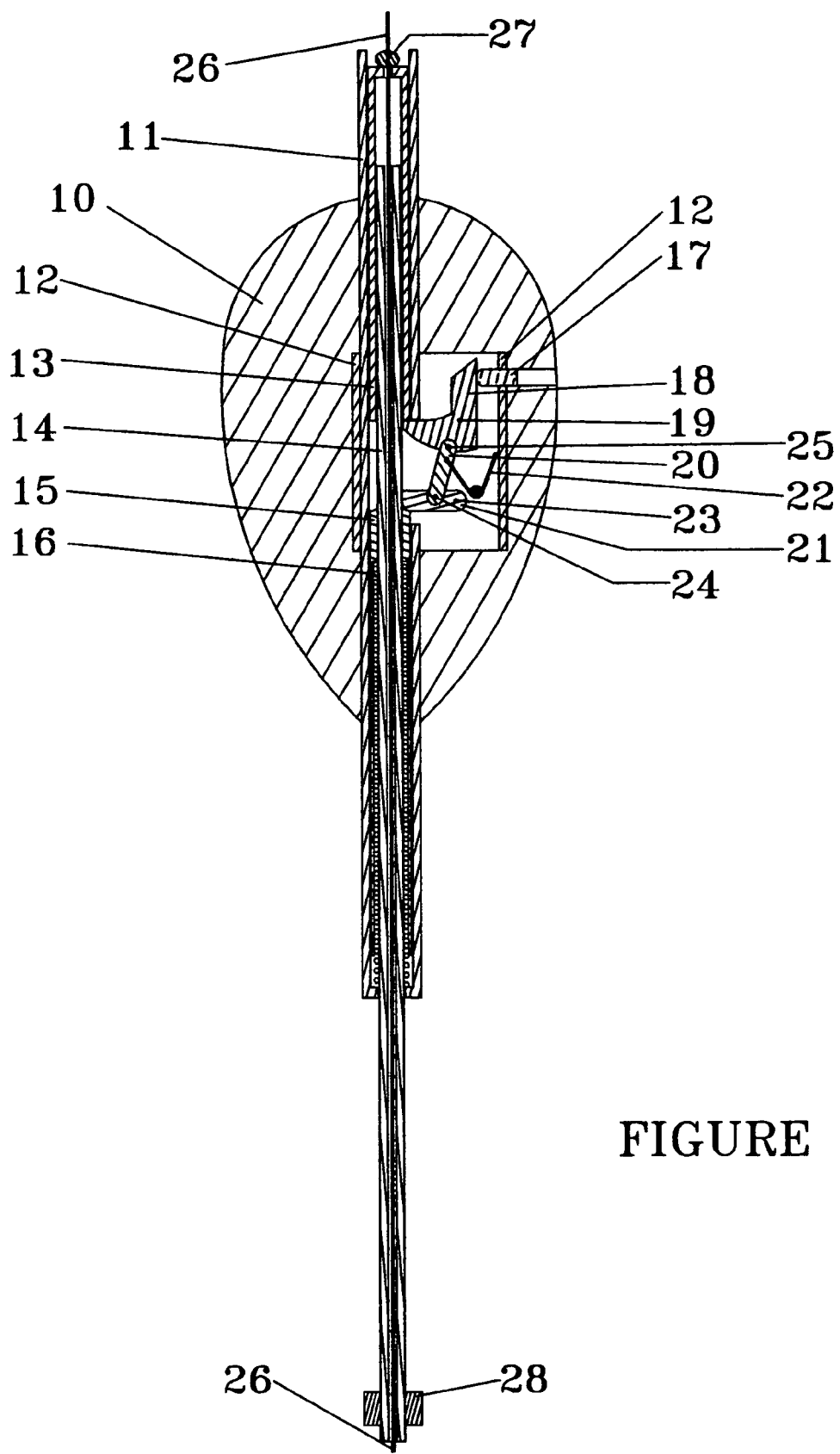
FIG. 2 is a sectional front view of the Bobber with automatic Hook set Device, with the spring compressed and locked in the set position.
Figure 3:
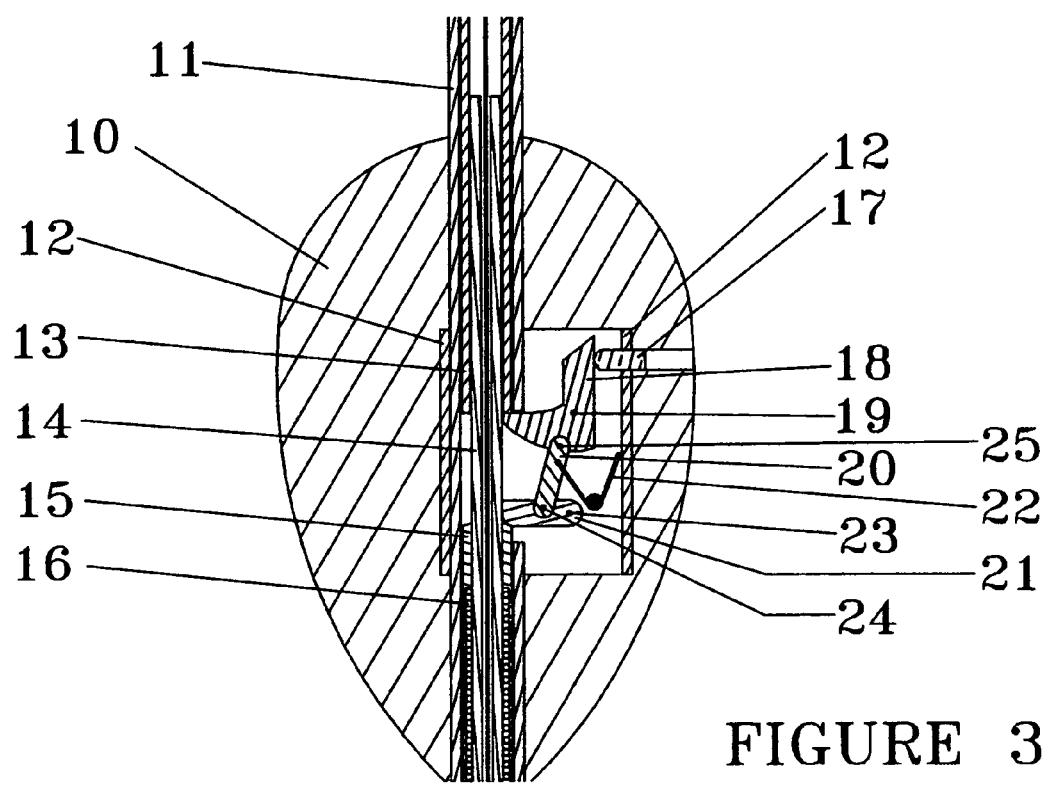
FIG. 3 is an enlarged sectional front view of the Bobber with automatic Hook set Device in the set position.
Figure 4:
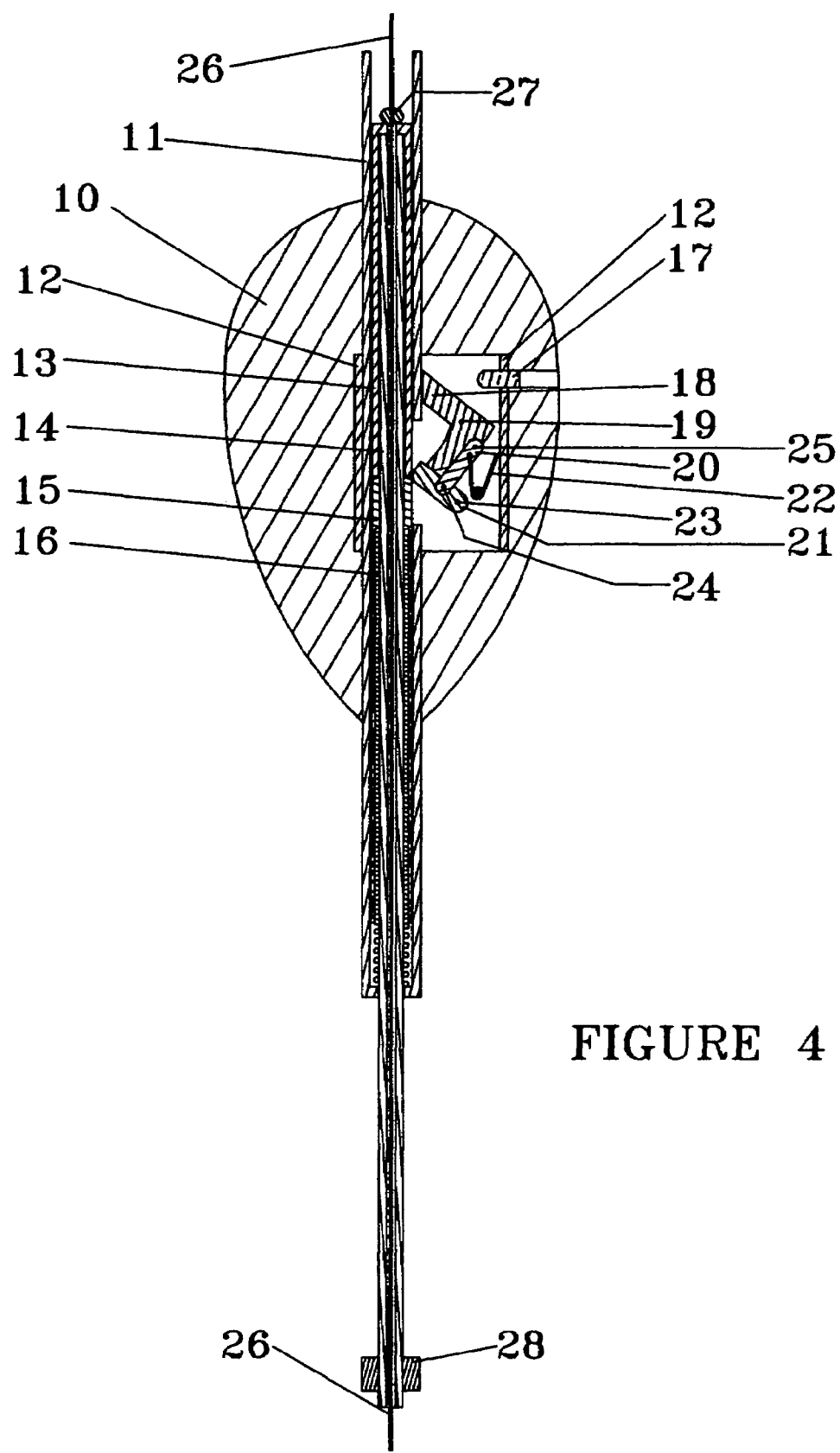

FIG. 4 is a sectional view of the Bobber with automatic hook set device after the trigger 13 has pushed the trigger pawl 18 down and released the locking/release mechanism. The Slide 14 and Spring Sheath 15 assembly, has began to move up, pushing the Locking pawl 21, upward. The Slide 14 and Spring sheath 15 assembly then comes into contact with the trigger 13.

Figure 5:
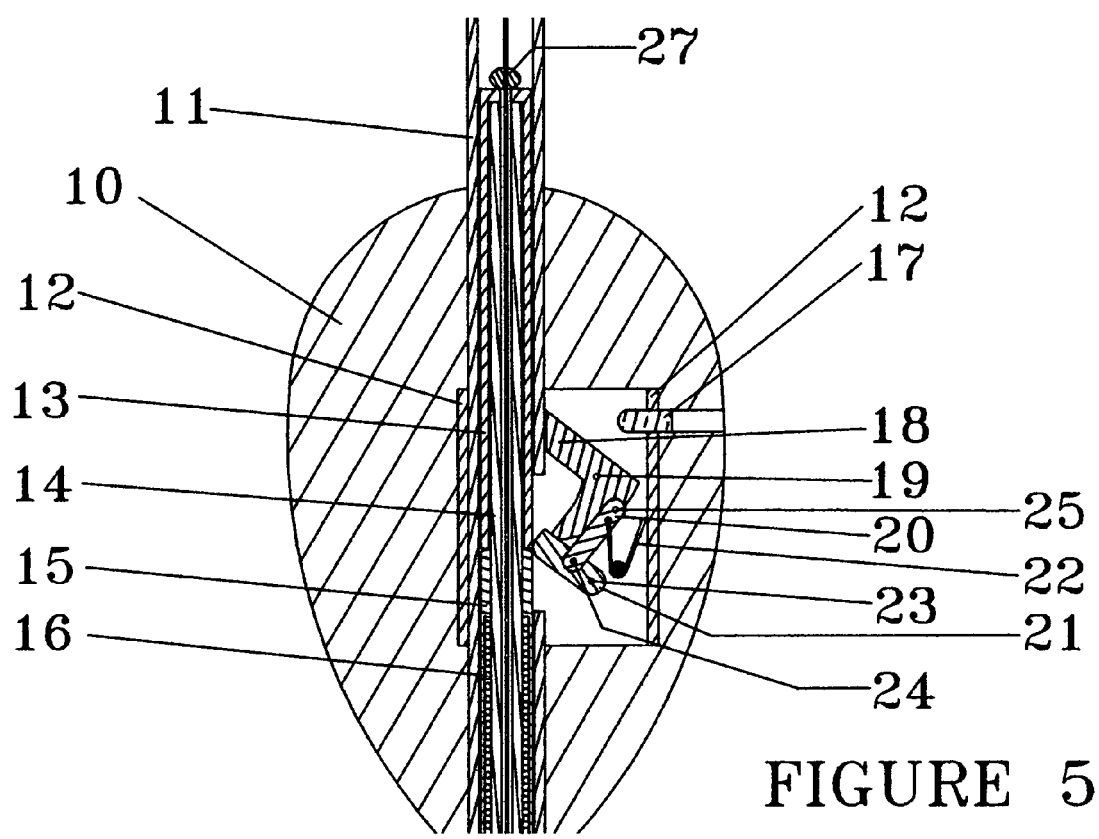

FIG. 5 is an enlarged view of the Bobber with automatic hook set device in the same position as FIG. 4.

Figure 6:
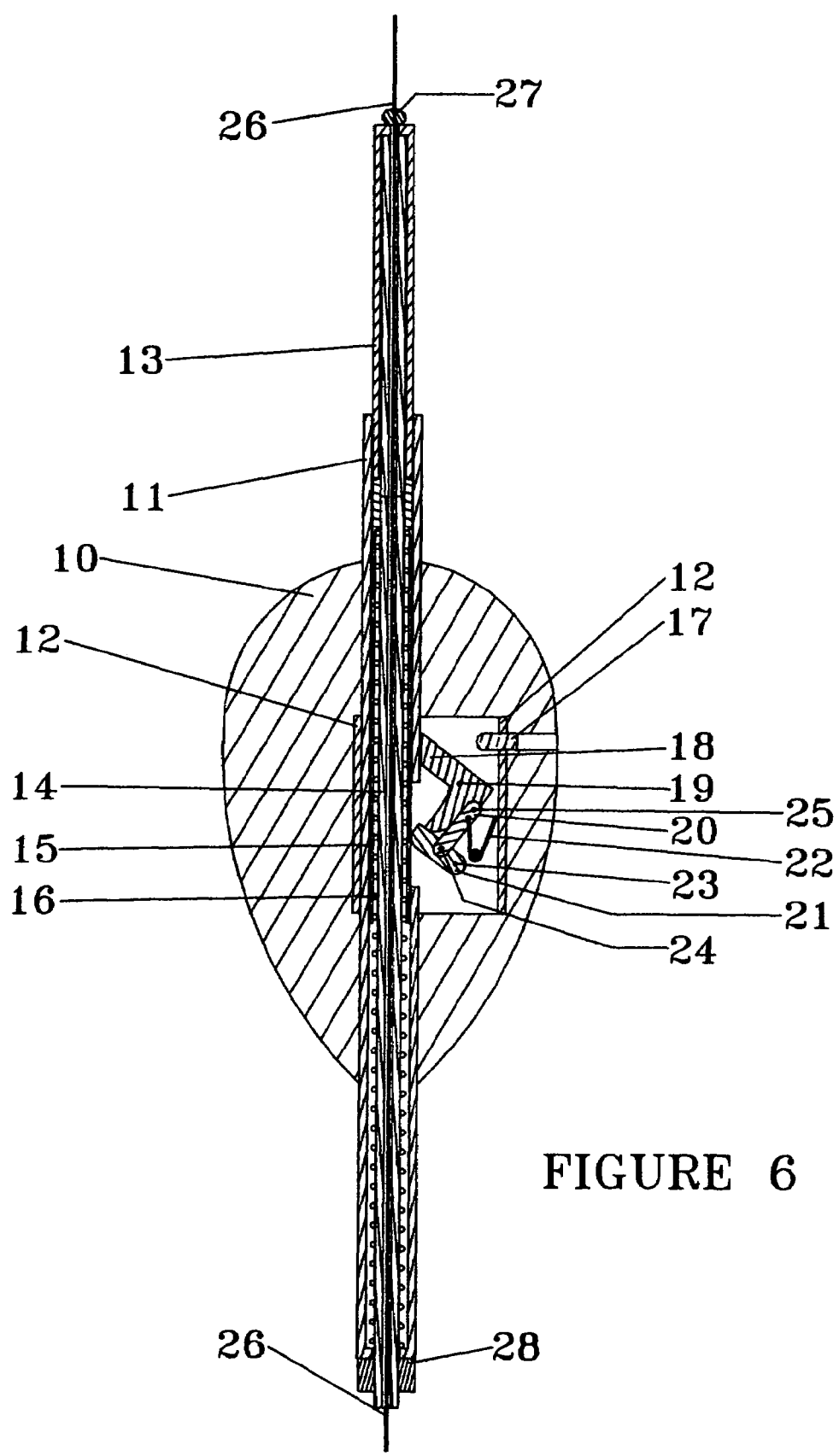

FIG. 6 is a front sectional view of the Bobber with automatic hook set device after the device has been released. The Slide 14, Spring sheath 15 and trigger 13 have moved upward the full extent of their travel.

Figure 7:
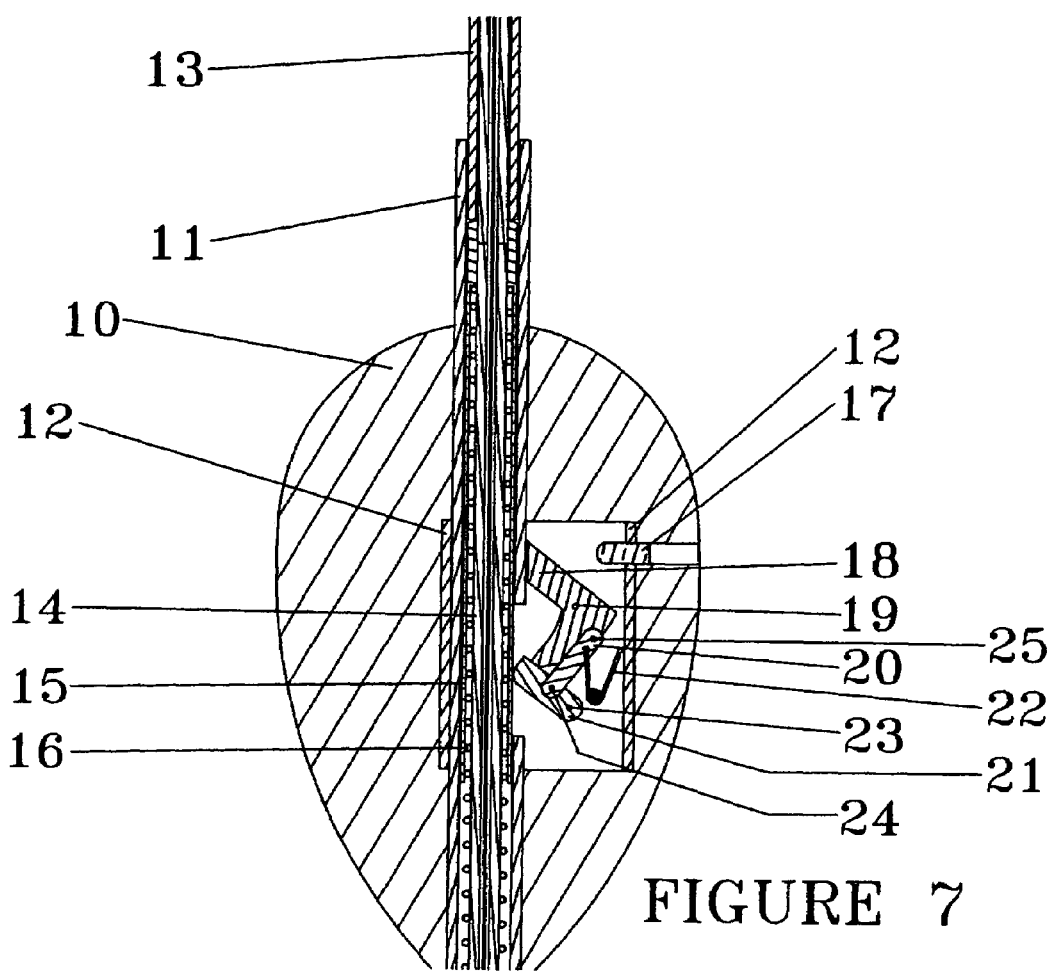

FIG. 7 is an enlarged midsection of FIG. 6. It shows the Spring sheath 15 holding the Locking pawl 21 in the locking pawl's 21 released position.

Figure 8:
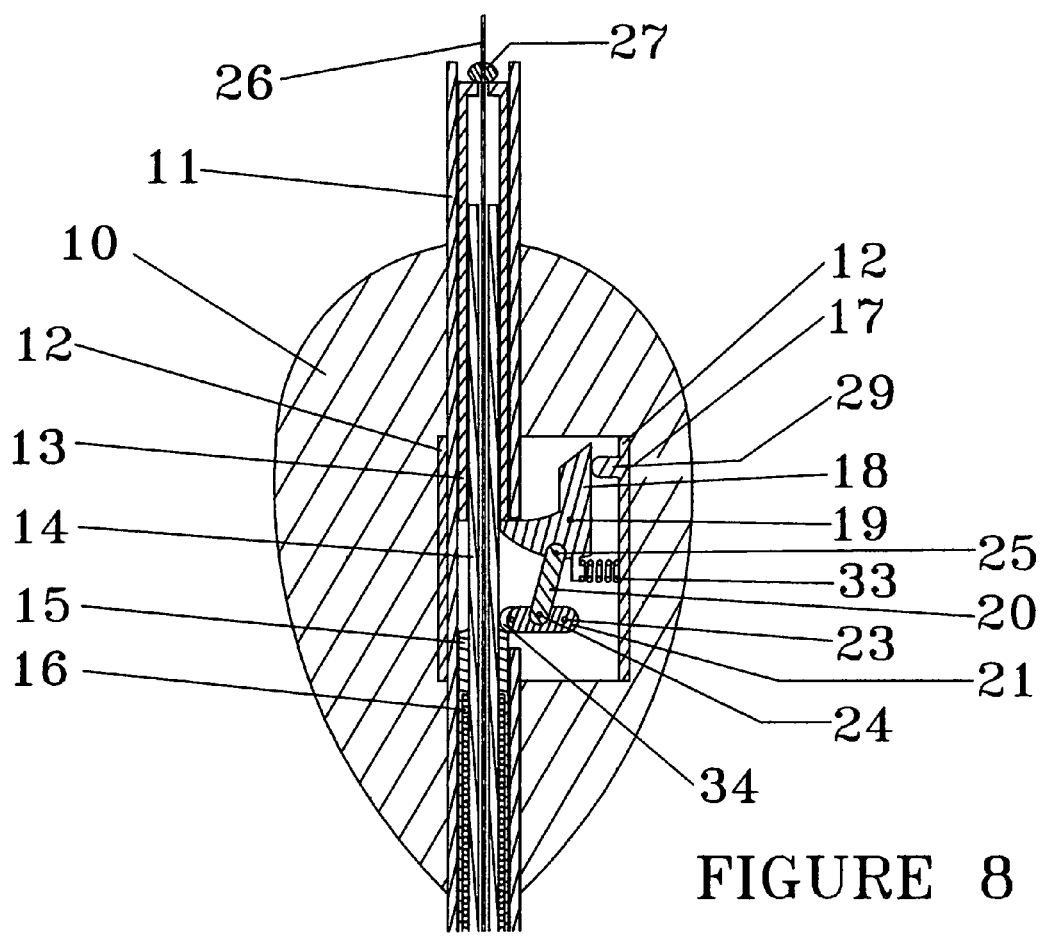

FIG. 8 shows an alternative embodiments, with a Trigger pawl stop 29, and the Auto-locking Coil spring 33, and the Slide locking pawl roller 34.

Figure 9:
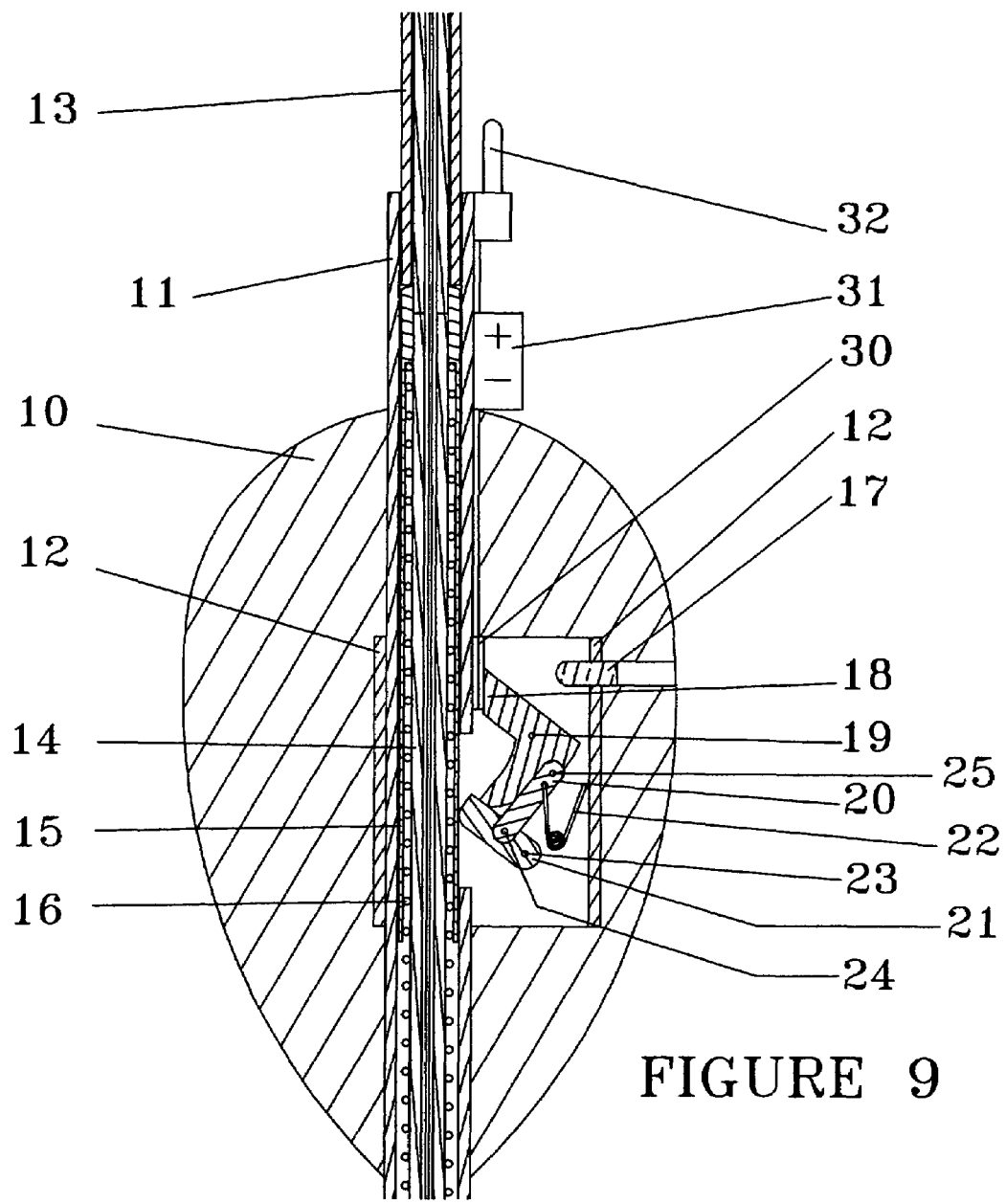

FIG. 9 shows an alternative embodiment including, electrical contacts 30, a battery 31 and a light bulb 32 for a lighted version of the Bobber with automatic hook set device.

REFERENCE NUMBERS IN DRAWINGS

10 Float
11 Slide Tube
12 Release Mechanism Frame
13 Trigger
14 Slide
15 Spring Sheath
16 Spring
17 Optional Sensitivity
18 Trigger Pawl Adjustment Screw
19 Trigger Pawl pivot pin
20 Interlocking Link
21 locking Pawl
22 Auto-locking Spring
23 locking Pawl pivot pin
24 Interlocking link pivot pin
25 Interlocking link pivot pin
26 Fishing Line
27 Enlargement placed on fishing line
28 Slide stop
29 Trigger pawl stop
30 Electrical Contacts
31 Battery
32 Light bulb
33 Auto-locking Coil spring
34 locking pawl roller

DESCRIPTION—FIGS. 1, 2, 3, 4, 5, 6, 7—PREFERRED EMBODIMENT

The preferred embodiment of the current invention is illustrated in FIGS. 1, 2, 3, 4, 5, 6, 7. This device consists of an automatic hook-set device attached to a fishing float. The float 10 can be manufactured from any buoyant material or accomplished with a chamber of air. The float will have a passage through it to accommodate the insertion of the automatic hook set device.

The hook set device consists of a slide tube 11, which passes through the float 10. The slide tube 11 can be manufactured out of plastic. It is basically a tube with a slightly restricted opening at one end and a slot in the sidewall for the passage of the trigger pawl 18 and the Slide locking pawl 21. The slide tube 11 holds the, slide 14, the spring sheath 15, the spring 6, and the Trigger 13, inside of it. The release mechanism frame 12 is positioned on the outside of the slide tube 11.

The slide 14 can be manufactured of plastic; it is basically a tube which allows the free passage of the fishing line down through the center passage.

The spring sheath 15 is basically a tube with a restricted opening at one end. The restricted end of the spring sheath 15 is slid upward over the slide 14 and then fastened into position onto the slide 14. This creates a shoulder at a midpoint on the slide 14. The skirt on the spring sheath projects downward and rubs against the locking pawl 21 after the device has been released, keeping the locking pawl 21 in the released position. This keeps the locking pawl 21 in the released position until the slide 14 and spring sheath 15 assembly is pulled down into the set position again.

The spring 16 is a coil spring that slides up over the slide 14 and up inside the spring sheath 15, and then this assembly slides down inside the slide tube 11. The end of the slide 14 then passes through the slightly restricted opening on the bottom end of the slide tube 11 and the coil spring comes to rest against the restricted lower end of the slide tube 11.

The trigger 13 is cylindrical in construction with a slightly restricted top end, it also slides down into the slide tube 11 and over the top of the slide 14. When the hook setting device is in the set position the bottom edge of the trigger 13 comes to rest on the end of the trigger pawl 18 that protrudes through the passage in the side of the slide tube 11. The top edge of the passage can be used to limit the rotation of the trigger pawl 18.

The automatic locking and release assembly consists of a release mechanism frame 12 which can be made of plastic and is positioned onto the outside of the slide tube 11.

Inside of the release mechanism frame 12 is the trigger pawl 18 which can be made of plastic. The trigger pawl 18 pivots on a trigger pawl pin 19 which can be made of metal. The end of the trigger pawl 18 passes through a passage in the side of the slide tube 11 when the trigger pawl 18 is rotated up into the trigger pawl's set position. The trigger 13 then rests on the end of the trigger pawl 18 that protrudes through into the inside bore of the slide tube 11, when the hook-setting device is in the set position.

Also inside of the release mechanism frame 12 is the locking pawl 21. The locking pawl 21 pivots on one end at the locking pawl pivot pin 23. The other end of the locking pawl 21 passes through a passage in the side of the slide tube 11 and comes to rest on the top edge of the spring sheath 15. An optional embodiment of the locking pawl 21 is the addition of the locking pawl roller 34, as shown in FIG. 8. The locking pawl 21 and the trigger pawl 18 are connected by the interlocking link 20. The interlocking link can be made of plastic. The interlocking link 20 is connected on one end to the trigger pawl 18 by the interlocking link pivot pin 25, and the other end is connected to the locking pawl 21 by interlocking link pivot pin 24.

The alignment of the interlocking link pins 24 and 25 and the trigger pawl pin 19 determines the amount of pressure required to release the mechanism when the hook setting mechanism is in the set position.

When the Bobber with automatic hook set device is in the set position the pressure of spring 16 will cause the top edge of the Spring sheath 15 to press against the locking pawl 21. This pressure will be transferred from the locking pawl 21 through the interlocking link 20 to the Trigger pawl 18. The closer that the Interlocking link pins 24 and 25 and the Trigger pawl pin 19 are to being in alignment, the less pressure that will be required from the Trigger 13 onto the tip of the Trigger pawl 18 to cause the Trigger Pawl 18 to rotate and release the device.

Also in the release mechanism frame 12 is the auto locking spring 22, this spring can be designed in several different configurations such as, a spiral spring, as drawn in the preferred embodiment or a coil spring as shown in FIG. 8 or it could be designed as a leaf spring. The important thing to consider in regards to the Autolocking spring 22 is the location that it bears on the locking mechanism. The auto locking spring 22 bears on the linkage between the interlocking link pivot pin 24 and the trigger pawl pivot pin 19. The pressure of the auto locking spring 22 causes the position of the linkage at the interlocking link pivot pin 25 to automatically move past the locking point of the linkage which is a center line drawn from the center of Trigger pawl pivot pin 19 and the center of Interlocking link pivot pin 24 in FIGS. 2 and 3. The Auto-locking spring 22 causes the locking pawl 21 to rotate down into it's locked position and also rotates the Trigger pawl 18 up into it's locked position.

Also in the release mechanism frame 12 is the optional sensitivity adjustment screw 17. The optional sensitivity adjustment screw 17 bears upon the linkage at such a position to control how far the inter locking link pivot pin 25 moves past the locking point of the linkage when the device is in the set position. The locking point of the linkage can be seen by drawing a line from the center of the trigger pawl pivot pin 19 and the center of the inter locking link pivot pin 24 in FIGS. 2 and 3. As the optional sensitivity adjustment screw 17 is adjusted, the alignment of the pivot pins; trigger pawl pivot pin 19, interlocking link pivot pin 24, and the interlocking link pivot pin 25, can be changed. Then as the pins come closer to being aligned, less downward pressure from the trigger 13 is required upon the tip of trigger pawl 18 to release the hook-setting device.

Additional Embodiments

FIG. 8—In this additional embodiment the optional sensitivity adjustment screw 17 has been eliminated and replaced with a Trigger pawl stop 29. Also the Auto-locking spring 22 has been eliminated and replaced by an Auto-locking coil spring 33, this will show that any type of spring, that functions properly, can be used. This embodiment also shows the addition of the locking pawl roller 34.

FIG. 9—This is a lighted version of the current invention with Electrical contacts 30, a Battery 31 and a Light bulb 32.

Advantages

From the description above a number of advantages of this bobber with automatic hook-setting device become evident:

A.) The line slides freely through the device, with the use of an adjustable bobber stop, any length of line can be suspended below the bobber.

B.) The mechanical advantage created by the positioning of the trigger pawl and associated linkage allows minimal downward force, applied by fish through the fishing line, to release the hook-setting device. The release mechanism is therefore very sensitive.

C.) This bobber with automatic hook setting device is very easy to operate.

D.) The sensitivity of this hook-setting device will reduce fish mortality of fish that are caught and released, due to the fish being hooked before they have a chance to ingest the hook deep into their throat and gills where they could otherwise receive life-threatening injury.

E.) This device has a potential to be manufactured in a variety of sizes.

F.) With the attachment of a small battery, electrical contacts, a light, or buzzer this bobber with automatic hook-setting device could become a very useful night fishing tool.

G.) The ability of the hook set device to "automatically", set and release, makes this device very simple to operate.

Operation—FIGS. 1, 2, 3, 4, 5, 6, 7

The process for using this Bobber with automatic hook-setting device is as follows:

A.) Fisherman must first decide how much line they want to hang below the bobber and place an enlargement 27 on the fishing line 26 at the point on the fishing line 26 that will be at the top of the hook-setting device while fishing. The enlargement can consist of a piece of thread or rubber band tied onto the fishing line 26 or a plastic bead which the fishing line 26 has been passed through a couple of times.

B.) Now the fishing line must be inserted down through the small opening in the top of the trigger 13 and the fishing line must continue down through the slide 14 and be pulled out of the bottom of the slide 14.

C.) Next the hook or lure can be attached to the end of the fishing line 26 below the bobber.

D.) Now starting with the hook setting device in the released position, as in FIGS. 6 and 7, the trigger 13 must be protruding out of the top of the slide tube 11, then the fisherman can grasp the body of the float 10 in one of their hands and grasp the slide stop 28 with their other hand. Then pulling down with one hand and up with the other: the slide 14 and spring sheath 15 will move downward compressing the spring 16.

E.) As the top edge of the spring sheath 15 moves down past the locking pawl 21 the pressure created by the Auto locking spring 22 will cause the locking pawl 21 to rotate down into its locked position.

F.) As the Slide locking pawl 21 movies into the locked position, the interlocking link 20, and the pressure of the auto locking spring 22, will cause the trigger pawl 18 to rotate into the set position as in FIGS. 1, 2, 3. The optional sensitivity adjustment screw 17 or the Trigger pawl stop 29 or the top edge of the passage in the slide tube 11 side wall, will limit the rotation of the trigger pawl 18.

G.) The pressure of the auto locking spring 22 will cause the Trigger Pawl 18 and interlocking link pivot pin 25 to rotate, towards the Slide 14, past the locking point of the linkage, which is at a center line drawn from the center of the trigger pawl pivot pin 19 and the center of the interlocking link pivot pin 24 in FIGS. 2 and 3.

H.) Then the trigger pawl 18 will come against the optional sensitivity adjustment screw 17 or the Trigger pawl stop 29 or the slide tube 11.

I.) Now the fisherman can release the downward pressure on the slide stop 28.

J.) The slide 14 and the spring sheath 15 will move upward slightly and the top edge of the spring sheath 15 will come against the locking pawl 21.

K.) Due to the position of the three pivot pins; the trigger pawl pivot pin 19, the interlocking link pivot pin 24, and the interlocking link pivot pin 25. The pressure of the spring 16 pushing up on the locking pawl 21 will transfer through the Interlocking link 20 and cause the trigger pawl 18 to rotate and press against the optional sensitivity adjustment screw 17 or the Trigger pawl stop 29 or the slide tube 11.

L.) The Optional sensitivity adjustment screw 17 can be used to adjust the alignment of the, Trigger pawl pivot pin 19, Interlocking link pivot pin 25, Interlocking link pivot pin 24. The closer that these three pivot pins are to being in alignment, the less downward pressure on the tip of the Trigger pawl 18 from the trigger 13 that will be required to release the hook setting device.

M.) Now the trigger 13 can be allowed to slide down into the slide tube 11 until it comes into contact with the tip of the trigger pawl 18 that is protruding through the passage in the side of the Slide tube 11.

N.) The bobber with automatic hook-set device is now ready to use as in FIGS. 1, 2, 3.

O.) The bobber can be lowered into the water and the fishing line 26 will pass down through the assembly until the enlargement placed on the fishing line 27 rests on the top of the trigger 13. The trigger 13 will rest on the tip of the Trigger pawl 18.

P.) When a fish pulls on the bait, the downward pressure will transfer through the fishing line 26 to the enlargement placed on the fishing line 27 this will push down on the top of the trigger 13. The trigger 13 will push down on the tip of the trigger pawl 18.

Q.) The downward pressure on the tip of the trigger pawl 18 will cause the Trigger pawl 18 to rotate, this rotation will move Interlocking pivot pin 25 outward away from the Slide 14, past the locking point of the linkage. This rotation will in turn pull on the interlocking link 20, which will raise the Slide locking pawl 21 as in FIGS. 4, 5.

R.) Then the Spring 16 will push the Spring sheath 15, the Slide 14, and the Trigger 13 up through the slide tube 11 as in FIGS. 6 and 7.

S.) The skirt on the Spring sheath 15 will rub against the tip of the locking pawl 21 as the Slide 14 and Spring sheath 15 move upward. This will hold the locking mechanism in the released position as in FIGS. 6, and 7, until the user pulls the Slide 14 and Spring Sheath 15 assembly back down into the set position.

T.) As the slide 14 and the spring sheath 15 move upward they come into contact with the trigger 13.

U.) The trigger 13 will move upward engaging the enlargement placed on the fishing line 27 and this will jerk the fishing line 26 upward setting the hook.

V.) The trigger 13 will move upward and protrude out the top of the slide tube 11. If the trigger 13 is manufactured from a brightly colored material it will then visually alert the fisherman that the hook setting device has been released.

W.) Then after the hook set, if the fish is not hooked, and the center of gravity on the Bobber with auto-locking hook set device is adjusted correctly, the bobber will lie horizontally on the surface of the water, then if the fish bites again the bobber will stand back up vertically letting the fisherman know that the fish is biting again.

CONCLUSIONS, RAMIFICATIONS AND SCOPE

Accordingly the reader will appreciate how versatile this Bobber with automatic hook-setting device can be.

The Bobber with automatic hook-setting device is very simple to operate.

The Bobber with automatic hook-setting device can be manufactured in various sizes.

The ability of the fishing line to slide freely down through the Bobber with automatic hookset device, until an enlargement placed on the fishing line comes into contact with the top of the Bobber, allows the Fisherperson to use this device in any depth of water.

The mechanical advantage created by the components of the release mechanism allows the hook set device to be released by very little downward pressure on the fishing line. Meaning that the lightest biting fish will release the hook set device.

The sensitive nature of the hook set device will reduce fish mortality of released fish, because they will be hooked before they can ingest the hook deep enough to cause possible life threatening injuries.

The Optional sensitivity adjustment screw will allow the fisherman to adjust the hook set device for, possible casting of the bobber, different weights of lures or possible wave action.

This Bobber with automatic hook set device can also be manufactured in a night fishing version. With the addition of a small battery, electrical contacts and a light bulb this would become a very versatile night fishing tool. It would light up after the hook set device had released alerting the fisherperson.

Although the description above contains many specifics, these should not be construed as to limit the scope of the current invention. Thus the scope of the invention should be determined by the appended claims and there legal equivalents, rather than by the examples given.

I claim:

1. A bobber with an automatic hook set device comprising, a buoyant bobber through which said automatic hook set device passes,
    said automatic hook set device comprising;
    a slide tube having a lower end with a slightly restricted bore, and a sidewall having a passage therethrough at a midpoint for the passage of a locking and release mechanism,
    a coil spring slidably received inside said slide tube, said coil spring rests against said slightly restricted bore of said slide tube,
    a slide having a longitudinal passage to allow the passage of fishing line, said slide being slidably received inside said slide tube, said slide having a contact surface at a midpoint to engage said locking and release mechanism, said slide having a sheath projecting down from said contact surface, said sheath is slidably received over said coil spring and slidably received inside of said slide tube, said sheath will hold said locking and release mechanism in the released positions,
    a trigger that is slidably received, within said slide tube, that bears upon a trigger pawl when said locking and release mechanism is in the set positions,
    said locking and release mechanism comprising;
    a locking and release mechanism frame positioned at a midpoint on said slide tube, said trigger pawl rotationally attached to said locking and release frame,
    a locking pawl rotationally attached to said locking and release frame,
    a interlocking link rotationally attached to said trigger pawl and said locking pawl so as to allow said trigger pawl, said interlocking link, and said locking pawl to rotationally lock and hold said slide with said coil spring compressed, said locking and release mechanism having an auto-locking spring positioned as to urge said interlocking link, said trigger pawl, and said locking pawl into their locked position after said slide compresses said coil spring.

2. The bobber with said automatic hook set device of claim 1; wherein said locking and release mechanism comprises;
    an adjustment screw to change the rotational alignment of said trigger pawl, said interlocking link, and said locking pawl,
    wherein said locking pawl has a roller to contact said contact surface and said sheath on said slide,
    wherein said automatic hook set device has the addition of a battery, an electric signaling device and electrical contacts which engage and disengage as said automatic hook set device is released and set,
    wherein said bobber with automatic hook set device is weighted as to cause said bobber with said automatic hook set device to float vertical when set and lie horizontal after said automatic hook set device is released.

* * * * *